INVENTOR.
BERNARD J. WALLIS
BY
Barnes, Kisselle, Laisch & Choate
ATTORNEYS

United States Patent Office 3,521,761
Patented July 28, 1970

3,521,761
WORK TRANSFER MECHANISM
Bernard J. Wallis, 25200 Trowbridge Ave.,
Dearborn, Mich. 48124
Continuation-in-part of application Ser. No. 770,048,
Oct. 23, 1968. This application Mar. 13, 1969, Ser.
No. 806,885
Int. Cl. B65g 25/02
U.S. Cl. 214—1                    20 Claims

ABSTRACT OF THE DISCLOSURE

A transfer mechanism for indexing workpieces through a series of successive stations in the die of a press. The mechanism includes a pair of carriages spaced lengthwise of the die with one or both of the carriages being reciprocable in a direction lengthwise of the die. Support rods on each carriage are interconnected by a work-engaging finger bar and are reciprocable in a direction transversely of the carriage path of travel between work-engaging and retracted positions. A rotatable shaft extending between the carriages is operatively connected to the support rods for actuating the finger bars. The rotatable shaft is axially fixed to the movable carriage or carriages. A drive mechanism is provided with two drive members, one of which is connected to the shaft to rotate it and the other is connected to the shaft to reciprocate it axially.

---

This application is a continuation-in-part of my prior co-pending application Ser. No. 770,048, filed Oct. 23, 1968.

This invention relates to a work transfer mechanism of the type used for indexing workpieces through a series of successive stations of a multiple station die in a punch press.

Transfer mechanisms of the above described type and of conventional construction frequently employ one or a pair of work-engaging finger bars which extend lengthwise along the stations of the die for gripping the workpieces and indexing them to the next successive station in the die. The finger bars are usually supported at each end by a carriage which also has a length generally corresponding to the length of the die. The carriage in turn is mounted for sliding movement on a base secured to the bolster plate or bed of the press. A drive mechanism operated in timed relation with the reciprocation of the press ram reciprocates the carriage through a stroke corresponding to the distance between successive stations and a rotatable shaft also driven by the drive mechanism is employed for actuating the finger bars between work-engaging and retracted positions. The construction of the carriage requires the drive mechanism to be offset from the path of travel of the carriage.

While transfer mechanisms of this type have been used with a high degree of success and efficiency in production stamping operations, nevertheless such transfer mechanisms as conventionally constructed are in some instances (because of the workpieces being handled) costly to manufacture, unduly massive and difficult to mount on the bed of a press and still provide adequate space for the die. For example, where the carriage extends the full length of the transfer mechanism, it is obvious that the carriage must be offset from the drive mechanism and in some instances the space available for locating the die is sacrificed. In addition, where the carriage extends generally the full length of the transfer mechanism, carriages of different sizes are required where the transfer mechanisms themselves vary in size.

The present invention has for its object the provision of a transfer mechanism of the type described which is more economical to manufacture and which enables a greater utilization of the space on the press available for the location of a die in association with the transfer mechanism.

More specifically, in the transfer mechanism of the present invention the work-engaging finger bars are supported at each end by individual carriages which are operatively connected with the drive mechanism by a single shaft which is both reciprocated and oscillated by the drive mechanism. With this arrangement the spacing required between the individual carriages or support members adjacent each end of the work-engaging finger bar can be varied at will by simply shortening or lengthening the single reciprocating and rotating shaft which interconnects the carriages with the drive mechanism. In the case of a large transfer mechanism this eliminates the need of a relatively long carriage or the need of a complicated spacer in the form of a casting or weldment connecting the two ends of the carriage. It also enables the two carriages to be located in line with the drive mechanism as distinguished from being offset from the mechanism and, thus, allows more space for locating the die used in association with the transfer mechanism.

Figures 1, 2:
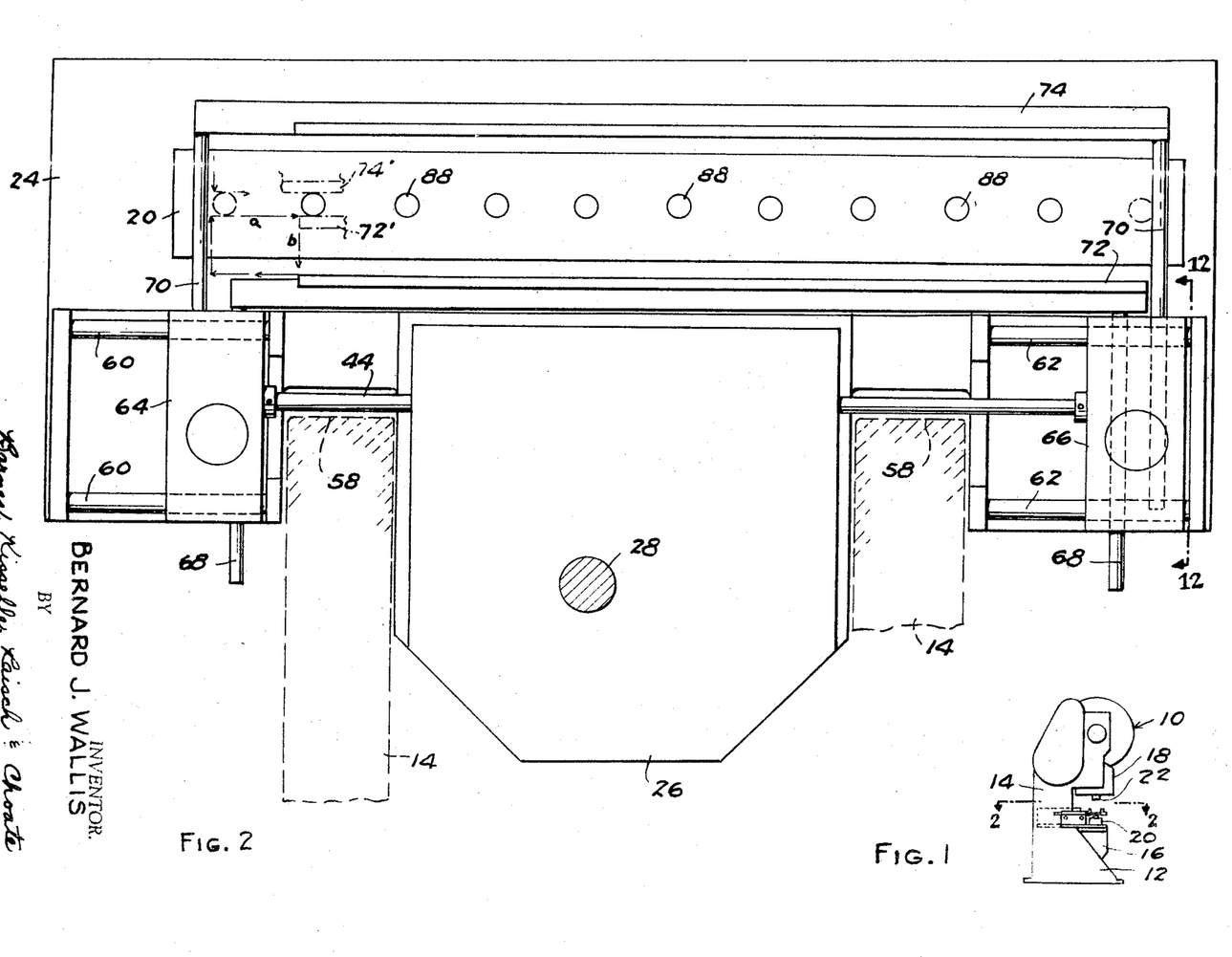
FIG. 1 is a side elevational view of a punch press equipped with a transfer mechanism of the present invention.
FIG. 2 is a sectional view along line 2—2 in FIG. 1.
Figure 7:
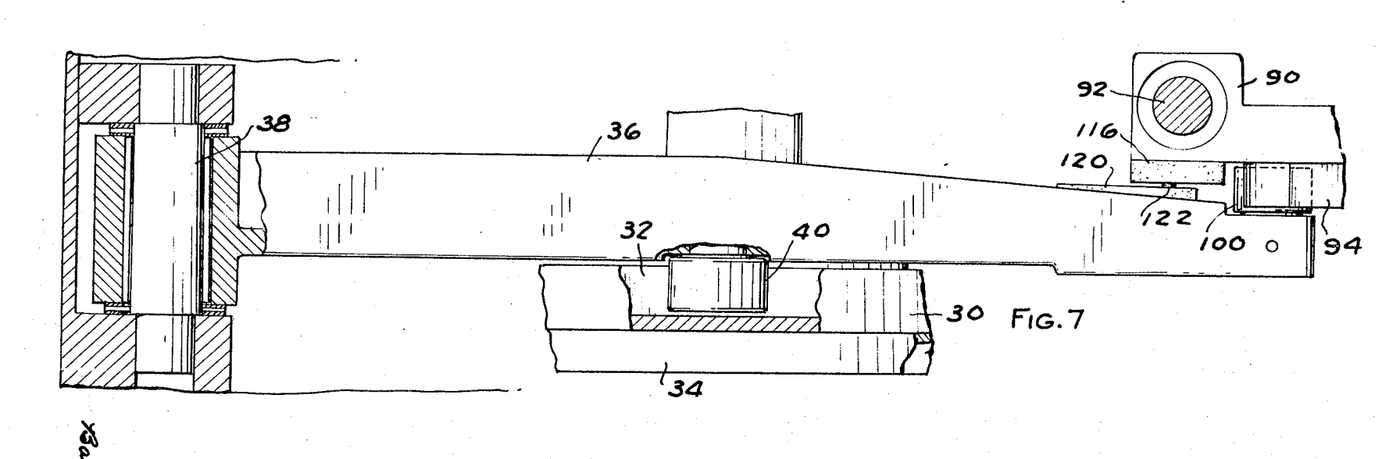
FIG. 7 is a sectional view along line 7—7 in FIG. 3.
Figure 8:
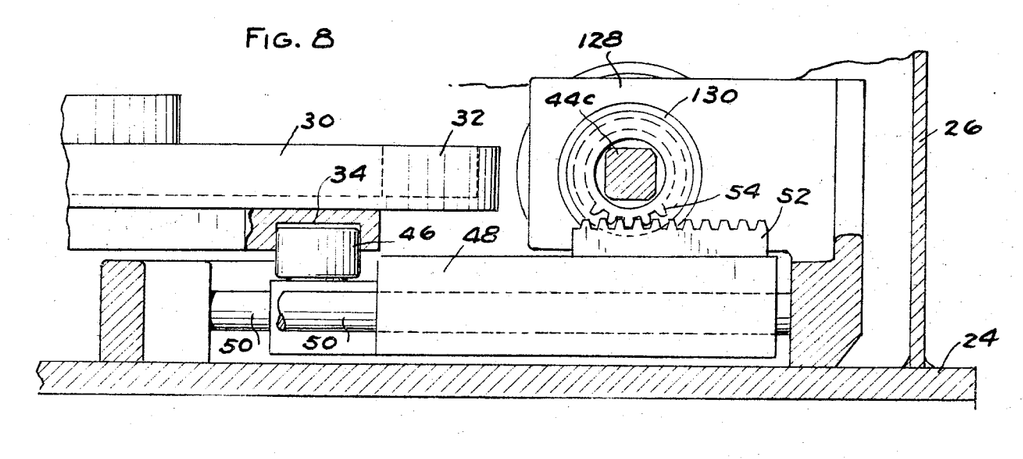
FIG. 8 is a sectional view along line 8—8 in FIG. 3.
Figure 9:
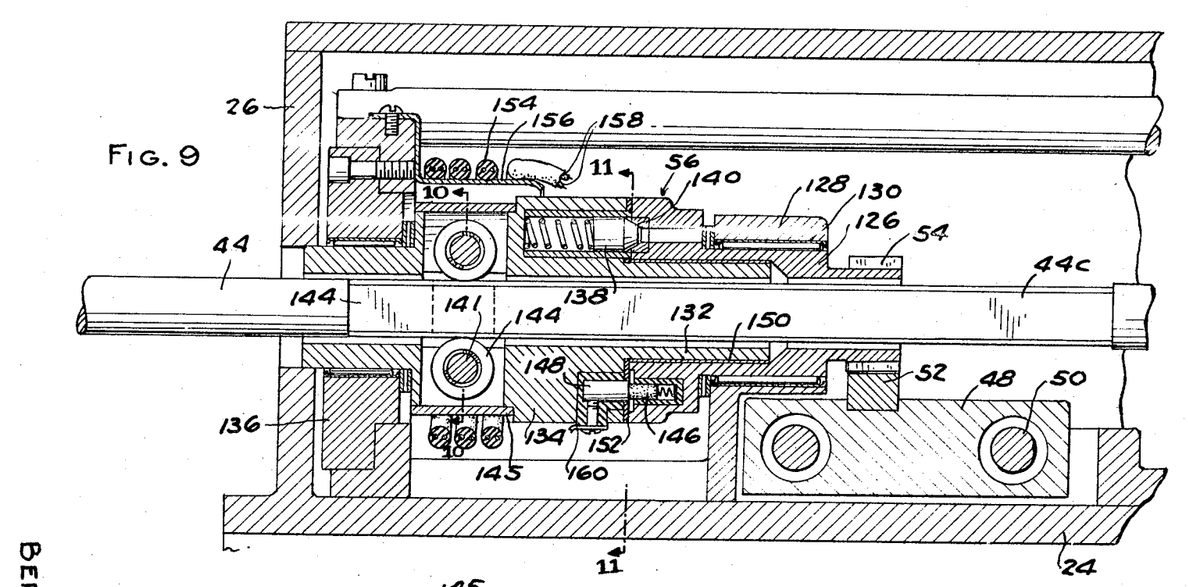
FIG. 9 is a sectional view along line 9—9 in FIG. 3.

Referring to FIG. 1, there is illustrated a punch press 10 having a frame 12 which includes a pair of spaced apart upright side supports 14. Between the side supports at the lower end of the press there is arranged a bolster plate or bed 16 and above the bed there is arranged a vertically reciprocating ram 18. In a press of this type the bottom section of the die is supported on bed 16 and the punch section of the die is mounted on ram 18. In FIGS. 1 and 2 the bottom die section is designated 20, the punch being indicated as 22 in FIG. 1. Referring now specifically to FIG. 2, the transfer mechanism of this invention includes a base plate 24 on which die 20 is mounted. Base plate 24 is in turn adapted to be bolted or otherwise secured to the bed 16 of the press. In the specific arrangement illustrated in FIG. 2 there is arranged on base plate 24 between the side frame members 14 a housing 26 in which the drive mechanism is enclosed. This drive mechanism is generally similar to the drive mechanism illustrated in my co-pending application Ser. No. 770,048, filed Oct. 23, 1968. The drive mechanism includes a vertically extending shaft 28 which is rotated in one direction in synchronism with the vertical reciprocation of the press ram 18. This type of vertical drive is illustrated in my U.S. Pat. No. 3,397,799, dated Aug. 20, 1968. Within housing 26 shaft 28 has a plate cam 30 fixed thereon. Cam 30 is formed with a cam groove 32 on the upper face thereof and a cam groove 34 on the lower face thereof (FIGS. 7 and 8). A lever 36, pivoted within housing 26 as at 38, has a cam follower 40 intermediate its ends engaged in cam groove 32. The free end of lever 36 is operably connected with a clutch mechanism generally designated 42 adapted to reciprocate a shaft 44 axially when lever 36 oscillates. A second cam follower 46 engages groove 34 on the underside of cam 30. Cam follower 46 is mounted on a slide 48 (FIG. 8) mounted on a slide 48 (FIG. 8) mounted on a pair of guide bars 50. A gear rack 52 on slide 48 meshes with a gear 54 associated with a second clutch mechanism 56 for rotating shaft 44.

Shaft 44 extends through housing 26 and projects outwardly from each side thereof as shown in FIG. 2. In the arrangement illustrated in FIG. 2, shaft 44 extends across the press 10 just forwardly of the vertical front edges 58 of the vertical side supports 14 of the press. Adjacent the outer side of each side support 14 there is mounted on base plate 24 a pair of guide rods 60, 62. Guide rods 60, 62 are parallel to shaft 44. On guide rods 60 there is slidably supported a carriage 64 and on guide rods 62 there is slidably supported a carriage 66. Each carriage 64, 66 slidably supports a pair of finger bar support rods 68, 70. A finger bar 72 is connected to and extends between the ends of support rods 68 and a second finger bar 74 is connected to and extends between the ends of the other support rods 70.

Figure 12:
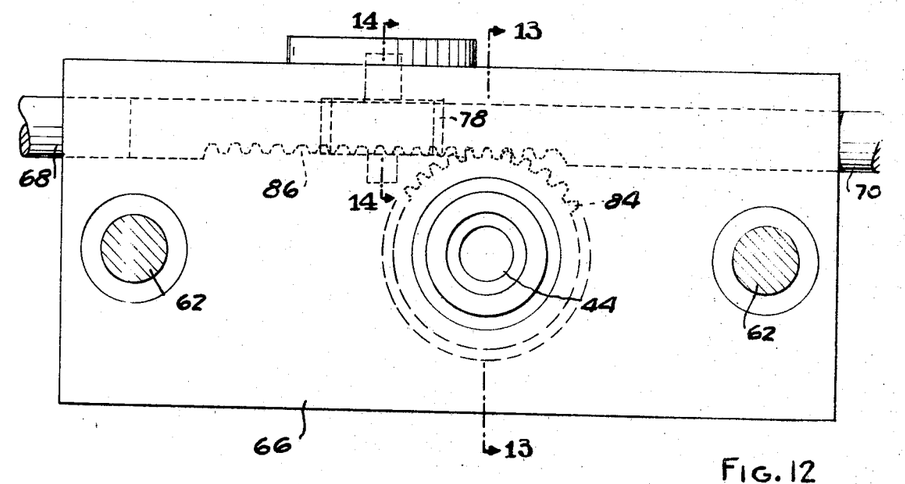
FIG. 12 is a sectional view along line 12—12 in FIG. 2.
Figures 13, 14:
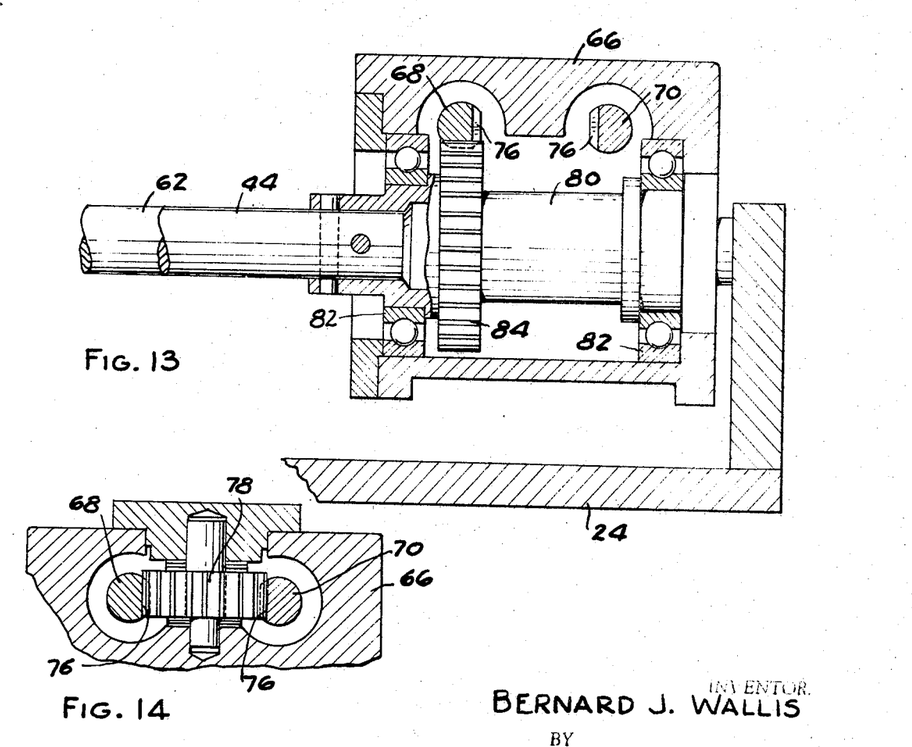
FIG. 13 is a sectional view along line 13—13 in FIG. 12.
FIG. 14 is a sectional view along line 14—14 in FIG. 12.

As shown in FIGS. 12 through 14, support rods 68, 70 are parallel and extend transversely of shaft 44. The inner opposing sides of each set of support rods 68, 70 are formed with gear rack portions 76 which mesh with a pinion gear 78 arranged therebetween so that the guide bars in each pair are constrained to move in opposite directions in parallel paths.

The opposite ends of shaft 44 are connected to the two carriages 64, 66 in the manner illustrated in FIG. 13. At each end shaft 44 has a sleeve 80 pinned thereto. Sleeves 80 are supported for rotation in the carriages 64, 66 by means of bearings 82 which also serve as thrust bearings to prevent relative axial displacement of sleeves 80 relative to the carriages so that the carriages reciprocate with shaft 44 as a unit. Each sleeve 80 has a pinion gear 84 fixed thereon which meshes with a rack portion 86 on the bottom side of support rod 68. It, therefore, follows that, when shaft 44 is reciprocated axially, the two carriages 64, 66 are shifted axially on guide rods 60, 62 as a unit with shaft 44 and, when shaft 44 is rotated in one direction, finger bars 72, 74 are shifted toward each other to the work-engaging position indicated in broken lines at 72' and 74' in FIG. 2 and, when shaft 44 is rotated in the opposite direction, the finger bars are shifted to the retracted positions shown in solid lines in FIG. 2.

In FIG. 2 the workpieces adapted to be engaged by finger bars 72, 74 are designated 88. The transfer distance between successive stations of die 20 is designated $a$ and the retraction stroke of the finger bars is designated $b$. Thus the throw of cam groove 32 is such as to produce through lever 36 a stroke of shaft 44 corresponding to the distance $a$ and the throw of cam groove 34 is such as to produce through rack 52 and pinion 54 a stroke of support rods 68, 70 corresponding to the distance $b$.

Referring now to FIGS. 3 through 7, the clutch mechanism, by means of which lever 36 is connected to shaft 44, includes a subcarriage 90 slidably mounted on a pair of guide rods 92 for reciprocation within housing 26 along a path parallel to the axis of shaft 44. A clutch disc 94 is rotatably supported on the underside of subcarriage 90 by a screw 96. Clutch disc 94 is formed with a radially elongated notch 98 in which a roller 100 at the free end of lever 36 is adapted to engage. Clutch disc 94 is also formed around the periphery thereof with three small notches 102, 104 and 106. A spring biased detent 108 is slidably supported on the underside of subcarriage 90 and is urged toward the periphery of clutch disc 94 so as to interengage with notches 102, 104, 106 when it registers radially therewith. In normal operation detent 108 releasably engages with center notch 104 to prevent relative rotation between disc 94 and subcarriage 90. Thus, with the parts in the condition shown in FIG. 1, when cam 30 is rotated to pivot lever 36 in a counter-clockwise direction, roller 100 at the free end thereof engages in notch 98 to shift subcarriage 90 to the left on guide bars 92. A yoke 110 fixedly mounted on the underside of subcarriage 90 by screw 96 straddles bearing discs 112 at opposite ends of an enlarged collar 114 on shaft 44 so as to reciprocate shaft 44 axially in response to the sliding movement of subcarriage 90 on guide rods 92.

In the event that axial reciprocation of shaft 44 is restrained by some force of predetermined magnitude, detent 108 is cammed out of engagement of notch 104 by the rotating force applied to disc 94 by lever 36 so that roller 100 swings out of engagement with notch 98 and disc 94 is rotated to a position wherein notch 102 registers with detent 108. At the end of the stroke opposite that shown in FIG. 3, detent 108 would engage notch 106. Thus, in the event shaft 44 is prevented from reciprocating, clutch mechanism 42 disconnects lever 36 from the shaft.

Figure 3:
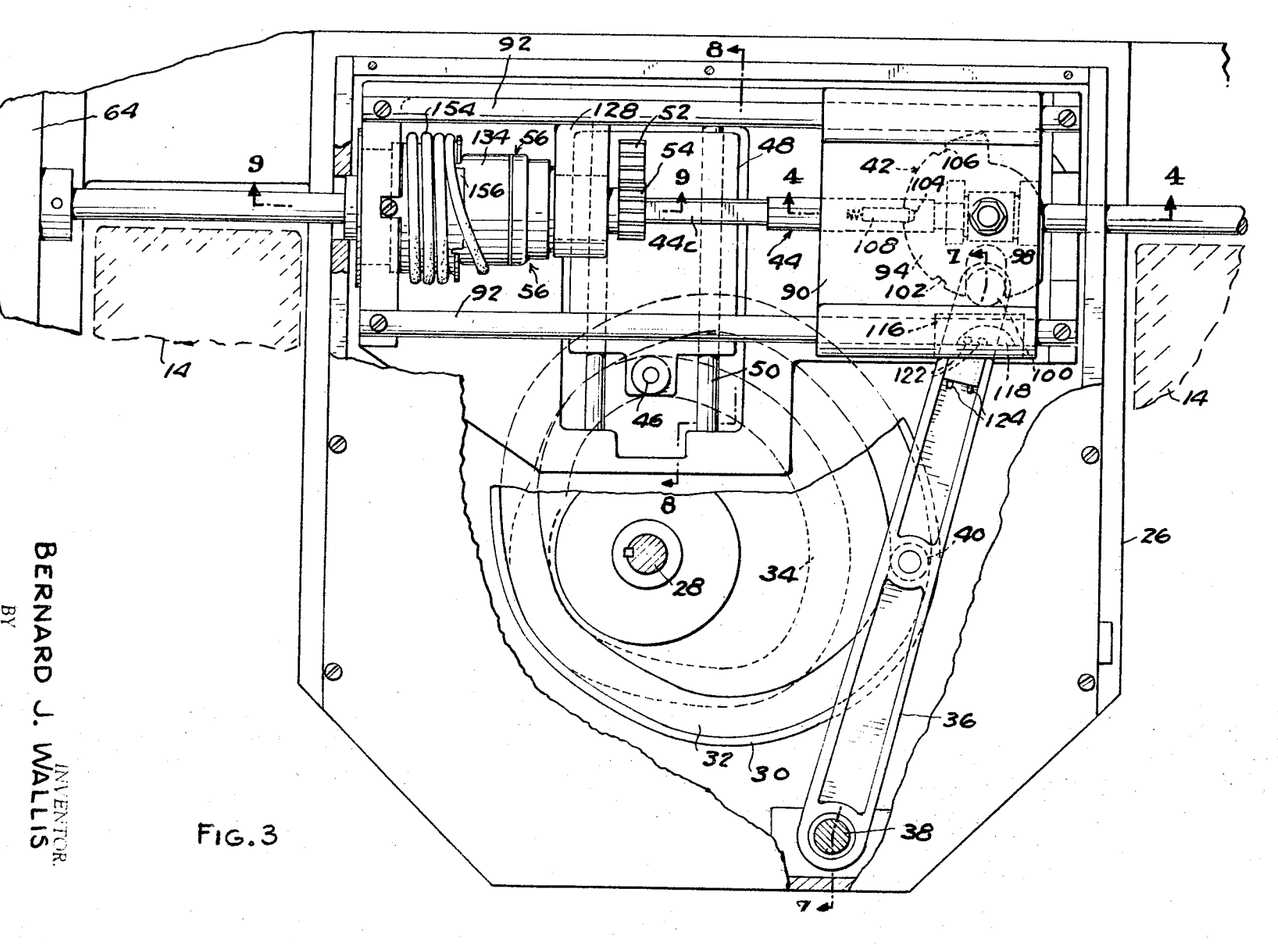
FIG. 3 is a plan view, partly broken away, of the drive mechanism for the transfer mechanism of this invention.
Figure 4:
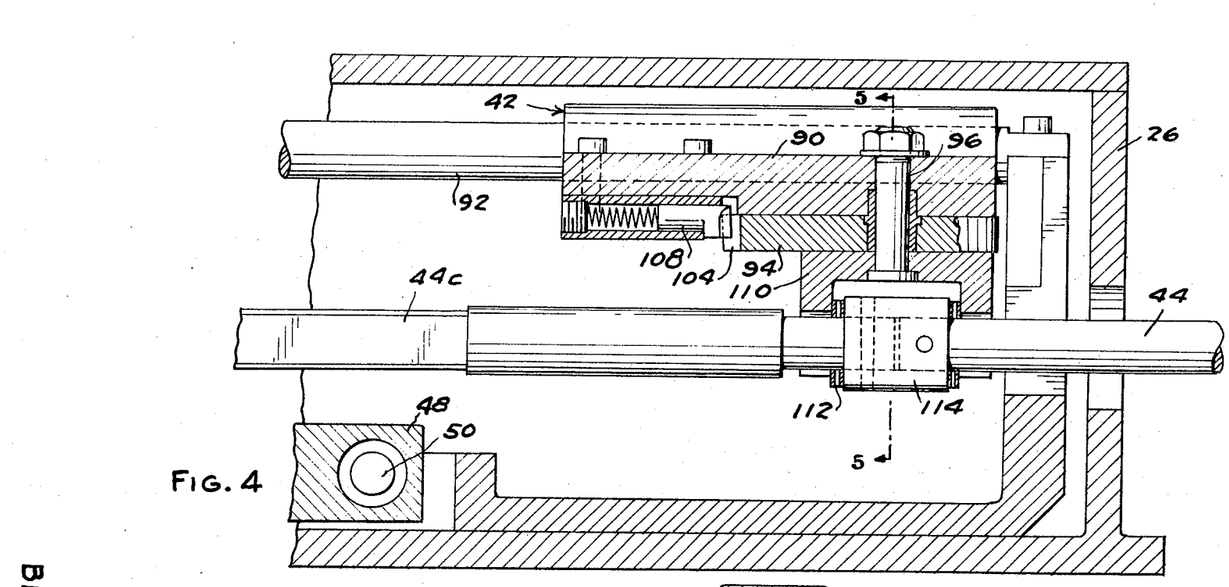
FIG. 4 is a sectional view along line 4—4 in FIG. 3.
Figure 5:
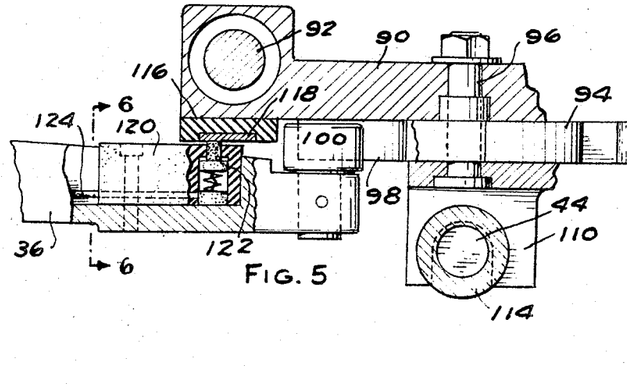
FIG. 5 is a sectional view along line 5—5 in FIG. 4.
Figure 6:
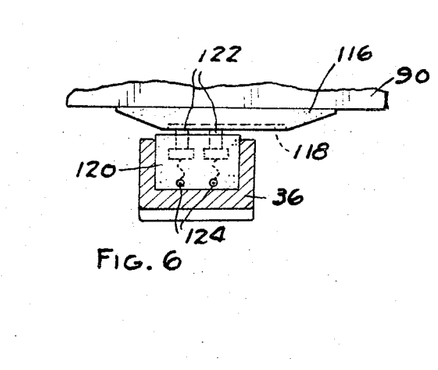
FIG. 6 is a sectional view along line 6—6 in FIG. 5.

When the clutch mechanism disengages lever 36 from shaft 44, it is desirable to automatically stop the press. An electrical cut-out switch is provided for this purpose. As shown in FIGS. 3, 5 and 6, the cut-out switch includes an insulating pad 116 on the underside of subcarriage 90 having a generally semi-circularly shaped copper disc 118 embedded therein. Disc 118 is positioned so as to generally overlie a portion of lever 36 when roller 100 at the end of lever 36 is engaged in notch 98. A cartridge 120 on lever 36 has a pair of spring biased brushes 122 which are adapted to contact disc 118 when roller 100 is engaged in slot 98 of clutch disc 94. Contacts 122 are connected in series by conductors 124 with the electrical controls of the press so that, when the circuit is broken at brushes 122, the press is deenergized. It will be appreciated that, as long as roller 100 is engaged in notch 98, the two brushes 122 will close a circuit through conductors 124 at copper disc 118. However, if detent 108 is cammed out of engagement with notch 104, when disc 94 rotates from the position shown in FIG. 3 to the position wherein detent 108 is engaged with either notch 102 or notch 106, the circuit through the electrical controls of the press is broken, thus stopping the press and preventing damage to the transfer mechanism and the die associated therewith. After the obstruction which produced disengagement of clutch mechanism 42 is removed the press may be jogged to an extent to re-engage roller 100 on lever 36 with notch 98 and thereby rotate disc 94 to a position wherein dentent 98 engages notch 104 to re-establish a driving connection between lever 36 and shaft 44. Considerably more force is required to cam detent 108 out of engagement with notch 104 than is necessary in the case of notches 102 and 106.

Figure 10:
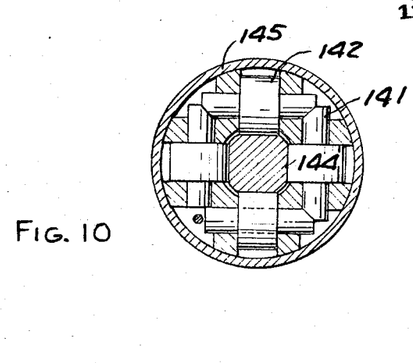
FIG. 10 is a sectional view along line 10—10 in FIG. 9.
Figure 11:
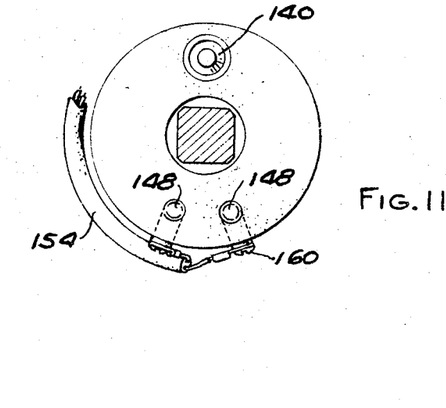
FIG. 11 is a sectional view along line 11—11 in FIG. 9.

Shaft 44 is in reality divided into at least three sections, the central section of which is designated 44c (FIG. 10) and is generally square in cross section. The successive sections of shaft 44 are connected together for rotation and reciprocation in unison. Pinion 54 which meshes with rack 52 on slide 48 is fixed to one end of a hollow shaft 126 through which shaft 44c extends. Hollow shaft 126 is journalled within a fixed pillow block 128 in housing 26 by bearings 130. The end of shaft 126 opposite pinion 54 is piloted on the cylindrical end portion 132 of a second hollow shaft 134 which is journalled in a second pillow block structure 136 through which shaft 44c also extends. A spring biased detent 138 in the end face of shaft 134 is adapted to register with a conical socket 140 in the confronting end face of hollow shaft 126 so as to establish a yieldable rotating driving connection between hollow shafts 126 and 134. Within shaft 134 there are journalled on pins 141 a plurality of four perpendicularly related rollers 142 which are arranged to engage the flat faces 144 of shaft section 44c so that when hollow shaft 134 is rotated it drives section 44c. The outer periphery of hollow shaft 134 is enclosed by a sleeve 145 at the section thereof wherein rollers 142 are journalled.

Detent 138 is adapted to be cammed out of engagement with conical socket 140 in the event that the finger bars 72, 74 jam for some reason. When detent 138 retracts out of engagement with socket 140 the actuation of finger bars 72, 74 is interrupted while hollow shaft 126 is free to continue rotation as driven by cam 30.

It is desirable to stop the press in the event that finger bars 72, 74 jam for some reason and, accordingly, an electrical disconnect is incorporated in the clutch mechanism 56. This electrical disconnect is in the form of a pair of series-connected spring biased electrical brushes 146 which are insulatively supported in the end face of hollow shaft 126. When detent 138 is engaged with socket 140 brushes 146 are adapted to contact a pair of electrically conducting studs 148 which are insulatively mounted in the confronting end face of hollow shaft 134. It will be noted that the confronting surfaces of shafts 126 and 134 are electrically insulated from one another by an insulating sleeve 150 and an insulating disc 152. An electrical conducting cable 154 which extends from the electrical control of the press is wrapped spirally around a shroud 156 surrounding hollow shaft 134. Cable 154 comprises a pair of conductors 158 which are connected to studs 148 by terminals 160. When detent 138 is engaged in tapered socket 140 to establish a driving connection between hollow shafts 126 and 134, conductors 158 are connected in series by brushes 146 to close a circuit to the electrical control of the press. However, if clutch mechanism 156 disengages the drive to shaft 44 brushes 146 rotate to a position out of contact with conductor studs 148 to open the circuit and stop the press. Since cable 154 is loosely spiralled around shroud 156 it is capable of the necessary extent of winding and unwinding to accommodate for the rotation of shaft 134. In the arrangement shown, shaft 44 rotates through less than one revolution to displace finger bars 72, 74 through their stroke b.

Figure 15:
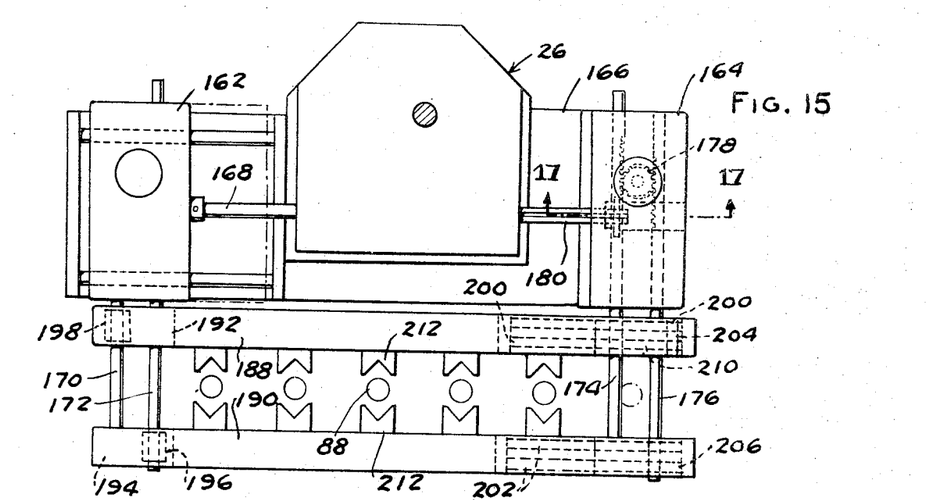
FIG. 15 is a plan view of a modified form of transfer mechanism according to the present invention.

The transfer mechanism shown in FIG. 15 differs somewhat from that illustrated in FIGS. 1 through 14. The drive mechanism in housing 26 is the same as that previously described and carriage 162 shown at the left of housing 26 is substantially the same as carriages 64, 66. However, at the right of housing 26 there is arranged a stationary carriage 164 which is fixedly mounted on base plate 166 of the transfer mechanism. The drive shaft 168 of the transfer mechanism is rotated and reciprocated in substantially the same manner as drive shaft 44 is connected with carriage 62 and the support rods 170, 172 in the same manner as in the previous embodiment described. The two support rods 174, 176 slidably mounted in fixed carriage 164 are interconnected by a pinion 178 so as to reciprocate in opposite directions. The portion of shaft 168 adjacent stationary carriage 164 has a spline cross section 180 and extends slidably through a similarly splined hub of a pinion 182 formed integrally with a sleeve 184. Pinion 182 meshes with a gear rack portion on support rod 174 so that, when pinion 182 is rotated, the two support rods 174, 176 reciprocate in opposite directions. Pinion 182 and its associated sleeve 184 are journalled in fixed carriage 164 by bearings 186.

The outer ends of support rods 170, 172 are connected with finger bars 188, 190 by a pair of similarly constructed and reversely positioned support blocks 192, 194 mounted on the underside of finger bars 188, 190. Support rod 172 is fixedly connected to support block 192 and is slidably guided in support block 194 by a bushing 196. Support rod 170 is fixedly connected to support block 194 and is slidably guided through support block 192 by a bushing 198.

The opposite ends of finger bars 188, 190 (the ends shown at the right of FIG. 15) each support a pair of guide bars 200, 202 on the undersides thereof. A slide block 204 is slidably supported on guide bars 200 and a similarly constructed but reversely positioned slide block 206 is slidably supported on guide bars 202. Finger bar support rod 174 is fixedly connected to slide block 204 and slidably engages a bushing 208 in slide block 206. Support rod 176 on the other hand slides through a bushing 210 on slide block 204 and is fixedly connected to slide block 206. It will be appreciated, of course, that in order to obtain a smooth sliding fit between the guide bars, the slide blocks and the support rods suitable bushings such as ball bushings may be employed.

With the arrangement shown in FIG. 15, when shaft 168 is rotated in opposite directions by the drive mechanism in housing 26 the two finger bars 188, 190 are reciprocated toward and away from each other to engage and disengage the workpieces 88. When shaft 168 is reciprocated axially by the drive mechanism in housing 26, carriage 162 is likewise shifted through the necessary stroke but the splined end portion 180 of shaft 168 merely slides through the hub of pinion 182. When carriage 162 is reciprocated through its stroke, finger bars 188, 190 are likewise reciprocated by reason of their positive connection with support rods 170, 172. However the ends of finger bars 188, 190 adjacent stationary carriage 164 simply slide axially on slide blocks 204, 206 by reason of support rods 200, 202. Finger bars 188, 190 are shown provided with work-gripping fingers 212 which are spaced apart a distance corresponding to the transfer distance between successive stations of the die used therewith. Similar fingers may be employed in the previously described form of transfer mechanism.

Figures 16, 17, 18:
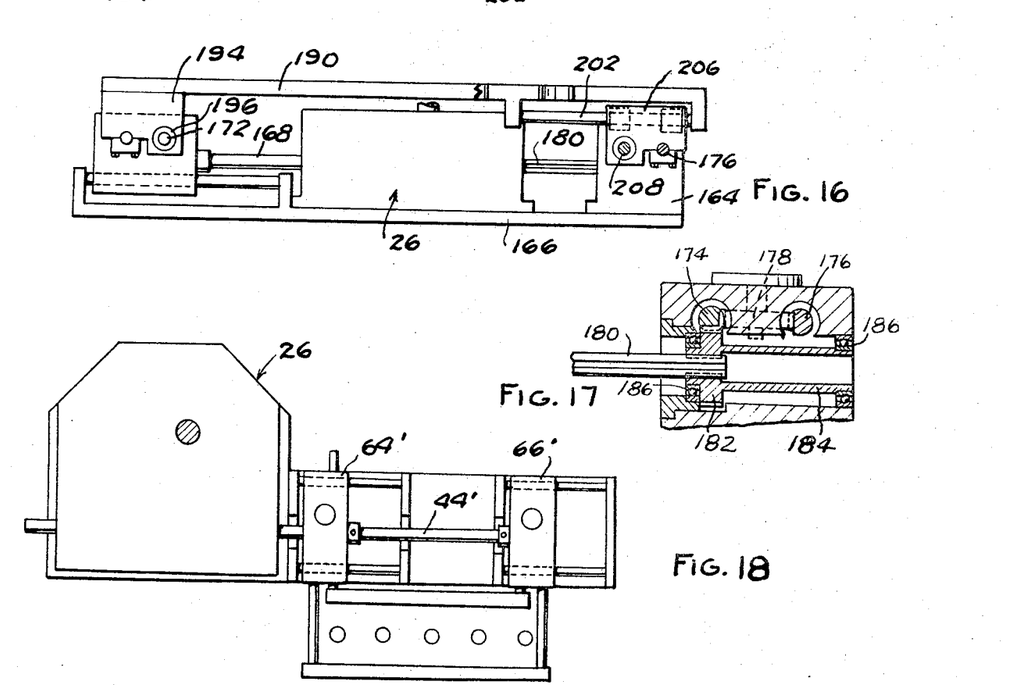
FIG. 16 is a front elevational view of the transfer mechanism shown in FIG. 15.
FIG. 17 is a sectional view along line 17—17 in FIG. 15.
FIG. 18 is a plan view of another modified form of transfer mechanism according to the present invention.

In the arrangement illustrated in FIG. 18 the drive mechanism enclosed in housing 26 is the same as previously described. This form of transfer mechanism differs from that illustrated in FIGS. 1 through 14 primarily in that the drive mechanism housing 26 is located at one end of the transfer mechanism rather than between the two carriages 64', 66'. In this arrangement the two carriages 64', 66', the construction and operation of which is the same as carriages 64, 66, are directly interconnected by shaft 44' which is reciprocated and rotated by the drive mechanism in housing 26 in substantially the same manner as described in connection with FIGS. 1 through 14.

It will be appreciated that, by reason of the complete separation of the two carriages from each other and from the drive mechanism as disclosed herein, considerable variation of the arrangement of these components is possible with a minimum of cost. For example, the arrangement shown in FIG. 2 could accommodate a die substantially longer than die 20 illustrated using exactly the same components and merely extending the length of shaft 44 and the length of finger bars 72, 74. Thus housing 26 and the drive mechanism located therein (with the exception perhaps of cam 30) and carriages 64, 66 with their associated components can be manufactured as standard units and assembled as desired to accommodate dies and workpieces which differ substantially in size and shape. Obviously this will tend to reduce the overall cost of the transfer mechanism since each transfer mechanism does not have to be custom designed to accommodate the die and workpiece to be handled thereby. It will also be appreciated that with the transfer mechanism disclosed herein, since the drive mechanism can be located between the two carriages and since the two carriages are independent of one another, a substantially greater area of the bed of the press is available for location of the die thereon. This would not be the case if the two carriages were laterally offset from the drive mechanism. Note, for example, in FIG. 2 that shaft 44 is located directly in front of the side supports 14 of the press. If the carriages 64, 66 were located along a line spaced forwardly of housing 26 the transfer mechanism would occupy a substantially greater space. It will also be appreciated that with the arrangement disclosed herein, since the two carriages are interconnected by only a single shaft, if it is desired to locate the transfer mechanism rearwardly of the position shown in FIG. 2 it merely becomes necessary to drill a hole in each side support 14 for accommodating shaft 44.

In connection with the clutch mechanisms 42 and 56, it will be noted that each of these clutch mechanisms is located directly adjacent shaft 44 which is utilized to both reciprocate the carriages and actuate the work-engaging finger bars. It is, of course, desirable to locate such safety clutches as close as possible to the ultimate drive member which in the embodiment illustrated in FIG. 2 comprises shaft 44.

I claim:

1. A work transfer mechanism for indexing workpieces through a series of successive stations comprising a support base, a drive mechanism on said support base having a drive member and a pair of driven members operated in response to actuation of the drive member, a pair of spaced apart carriages on said support base, at least one of said carriages being mounted on said support base for reciprocation in a rectilinear path extending in the direction of a line connecting said carriages, each carriage having a support member mounted thereon, said support members being arranged on said carriages for reciprocation in parallel paths extending transversely of the carriage path of travel, a work-engaging member extending lengthwise between and connected with said support members so that when the support members are reciprocated the work-engaging member is actuated between work-engaging and retracted positions, a rotatable shaft extending between said carriages and operatively connected with each of said support members to reciprocate said work-engaging member between said work-engaging and retracted positions when said shaft is rotated, one of said driven members having an operative connection with said shaft to rotate the shaft and means forming an operative connection between the other driven member and at least said one carriage for reciprocating said one carriage, said connection of the work-engaging member with the support member on said one carriage producing axial reciprocation of the work-engaging element with said one carriage.

2. A work transfer mechanism as called for in claim 1 wherein the support member on said other carriage is connected with the work-engaging member such as to permit the work-engaging member to shift lengthwise relative to and transversely of said last-mentioned support member.

3. A work transfer mechanism as called for in claim 1 wherein the support member on said other carriage has a slide member fixed thereon, said slide member having a guideway thereon extending parallel to the carriage path of travel, said work-engaging member having a guide member fixed thereon and engaging said guideway for enabling the work-engaging member to reciprocate in a direction transversely of said last-mentioned support member.

4. A work transfer mechanism as called for in claim 1 wherein said rotatable shaft is axially fixed to said one carriage and said last-mentioned operative connection includes said shaft.

5. A work transfer mechanism called for in claim 4 wherein said last-mentioned operative connection comprises a clutch adapted to release said operative connection when the resistance to axial reciprocation of said shaft exceeds a predetermined value.

6. A work transfer mechanism as called for in claim 5 including a switch for closing a circuit through an electrical control for the drive mechanism and means for opening said switch in response to release of said clutch.

7. A work transfer mechanism as called for in claim 4 wherein the operative connection between said one driven member and said shaft comprises a clutch adapted to release said operative connection when the resistance to rotation of said shaft exceeds a predetermined value.

8. A work transfer mechanism as called for in claim 4 wherein said other driven member comprises a pivotally supported lever, said shaft having a disc supported thereon for rotation about an axis extending transversely of the axis of the shaft, means releasably interconnecting said disc and shaft and yieldably resisting rotation of the disc and means on said disc engageable with said lever for axially reciprocating said shaft in response to oscillation of the lever when the disc is restrained from rotating.

9. A work transfer mechanism as called for in claim 8 wherein said yieldable restraining means comprises a resiliently biased detent on said shaft and an abutment on the disc adapted to be engaged by the detent, said detent being adapted to release said abutment when he resisance to axial reciprocation of the shaft exceeds a predetermined value.

10. A work transfer mechanism as called for in claim 4 including means on said support base forming a guideway extending parallel to the carriage path of travel, a guide member reciprocably mounted on said guideway, said last-mentioned operative connection comprising a driving connection between said other driven member and said guide member and a driving connection between said guide member and said shaft.

11. A work transfer mechanism as called for in claim 10 wherein said other driven member comprises a lever, the connection between said lever and said guide member including a releasable clutch, circuit means for controlling the operation of said drive mechanism including a switch, said switch including electrical contacts on said lever and said guide member which are adapted to register and close said circuit means when said clutch is engaged and to shift out of registration and open said circuit means when said clutch is released.

12. A work transfer mechanism as called for in claim 4 including a clutch between said drive mechanism and said shaft and a second clutch between said drive mechanism and said support members, said first-mentioned clutch being adapted to release said shaft when the resistance to axial reciprocation of the shaft exceeds a predetermined value and said second-mentioned clutch being adapted to release said support members when the resistance to reciprocation thereof exceeds a predetermined value.

13. A work transfer mechanism as called for in claim 12 including circuit means for controlling the operation of said drive mechanism, said circuit means including electrical switches associated with each of said two clutches, said switches being adapted to close said circuit means when the clutches are engaged and to open said circuit means when the clutches are disengaged.

14. A work transfer mechanism as called for in claim 1 wherein both carriages are mounted on said support base for reciprocation along said rectilinear path and said rotatable shaft is axially fixed to both carriages.

15. A work transfer mechanism as called for in claim 14 wherein said last-mentioned operative connection includes said rotatable shaft.

16. A work transfer mechanism as called for in claim 14 wherein said last-mentioned operative connection comprises a driving connection between said other driven member and said shaft, said driving connection being spaced axially of the shaft from the connection of said shaft with said carriages.

17. A work transfer mechanism as called for in claim 1 wherein said drive mechanism is disposed between said carriages.

18. A work transfer mechanism as called for in claim 1 wherein said drive mechanism is disposed between said one carriage which is opposite the other carriage.

19. A work transfer mechanism as called for in claim 1 wherein the operative connection between said one driven member and said shaft comprises a pair of axially adjacent clutch members concentric with said shaft, one of said clutch members being rotatably fixed on the shaft, the other clutch member being rotatable relative to the shaft and being rotated by said one driven member and resiliently releasable means interengaging said two clutch members, said resiliently releasable means being adapted to release the driving connection between the two clutch members when the resistance to rotation of said shaft exceeds a predetermined value.

20. A work transfer mechanism as called for in claim 19 including circuit means for controlling the operation of said drive mechanism, said circuit means including electrical contacts on said two clutch members which register and close the circuit means when the clutch members are interengaged and when shift out of registration and open said circuit means when the clutch members are disengaged.

References Cited

UNITED STATES PATENTS

| | | |
|---|---|---|
| 3,430,782 | 3/1969 | Henkel. |
| 3,432,042 | 3/1969 | Bautz. |

GERALD M. FORLENZA, Primary Examiner

G. F. ABRAHAM, Assistant Examiner

U.S. Cl. X.R.

198—218

PO-1050
(5/69)

UNITED STATES PATENT OFFICE
CERTIFICATE OF CORRECTION

Patent No. 3,521,761          Dated July 28, 1970

Inventor(s) WALLIS, Bernard J.

It is certified that error appears in the above-identified patent and that said Letters Patent are hereby corrected as shown below:

Column 8, line 19 - Cancel "he resisance" and insert -- the resistance --

Column 8, line 74 - Cancel "disposed between said" and insert -- located on the side of --

SIGNED AND
SEALED
OCT 13 1970

(SEAL)
Attest:

Edward M. Fletcher, Jr.
Attesting Officer

WILLIAM E. SCHUYLER, JR.
Commissioner of Patents